(12) United States Patent
Christensen et al.

(10) Patent No.: US 6,713,715 B2
(45) Date of Patent: Mar. 30, 2004

(54) METHOD AND SYSTEM FOR LASER MARKING A GEMSTONE

(75) Inventors: C. Paul Christensen, Fairhaven, MD (US); Sidney P. Wright, Severna Park, MD (US)

(73) Assignee: Potomac Photonics, Inc., Lanham, MD (US)

( * ) Notice: Subject to any disclaimer, the term of this patent is extended or adjusted under 35 U.S.C. 154(b) by 55 days.

(21) Appl. No.: 10/045,165

(22) Filed: Jan. 15, 2002

(65) Prior Publication Data

US 2002/0117486 A1 Aug. 29, 2002

Related U.S. Application Data

(60) Provisional application No. 60/261,213, filed on Jan. 16, 2001.

(51) Int. Cl.[7] .............................................. B23K 26/03
(52) U.S. Cl. .................................................. 219/121.68
(58) Field of Search ........................ 219/121.68, 121.69, 219/121.82, 121.83, 121.67, 121.7, 121.71, 121.72, 121.65, 121.66

(56) References Cited

U.S. PATENT DOCUMENTS

| | | | |
|---|---|---|---|
| 4,392,476 A | | 7/1983 | Gresser et al. |
| 4,467,172 A | | 8/1984 | Ehrenwald et al. |
| 5,410,125 A | | 4/1995 | Winston et al. |
| 5,573,684 A | | 11/1996 | Winston et al. |
| 5,886,318 A | * | 3/1999 | Vasiliev et al. ........ 219/121.69 |
| 5,932,119 A | | 8/1999 | Kaplan et al. |
| 6,211,484 B1 | * | 4/2001 | Kaplan et al. ......... 219/121.68 |
| 6,483,073 B2 | * | 11/2002 | Benderly ............... 219/121.68 |

* cited by examiner

*Primary Examiner*—M. Alexander
*Assistant Examiner*—Jonathan Johnson
(74) *Attorney, Agent, or Firm*—Rosenberg, Klein & Lee

(57) ABSTRACT

A system for laser marking a gemstone (10) is provided. A pulsed laser (20) generates a laser pulse (40) which is then directed towards a focusing element (60) through optical means (30). Lens (60) focuses the laser pulse into focused pulse (70). The focused pulse (70) is projected onto a surface of gemstone (80) which is mounted in fixture (90). A computer control system (110) allows a user to input and control a predetermined path of displacement between the gemstone (80) and the focused laser pulse (70).

10 Claims, 3 Drawing Sheets

US 6,713,715 B2

METHOD AND SYSTEM FOR LASER MARKING A GEMSTONE

CROSS REFERENCE TO RELATED PATENT APPLICATION

The subject Utility Patent Application is based upon a Provisional Application No. 60/261,213 filed Jan. 16, 2001.

BACKGROUND OF THE INVENTION

1. Field of the Invention

The subject invention relates to a method and system for laser marking a gemstone. In particular, the present invention directs itself to the generation of a laser pulse having a pulse duration of 1 nanosecond or less. More particularly, this invention directs itself to the positioning and marking of a gemstone to be marked by the focused approximate 1 nanosecond laser pulse.

Further, a computer control system displaces the gemstone with respect to the focused laser pulse, the displacement corresponds to a predetermined path defining the contour of indicia to be marked. Still further, this invention directs itself to a gemstone laser marking system including a video camera and display for viewing and recording the laser marking process.

Further, this invention pertains to a method and system for laser-marking a gemstone where the image of any indicia formed therein may be viewed in a magnified state.

Still further, this invention is directed to a method of marking a gemstone by using a pulsed laser having a predetermined pulse duration. Additionally, this invention relates to an automated system for precisely marking a gemstone in a predetermined pattern.

2. Prior Art

Laser marking systems for inscribing indicia on gemstones are known in the art. Kaplan, et al, Ehrenwald, et al., and Winston, et al. all teach laser marking systems utilizing focused energy from a pulsed laser to ablate or vaporize material on one or more facets of a polished gemstone. Laser ablation of diamond is generally a two-step process in which the laser energy first converts a shallow layer at the surface of the irradiated region from diamond to graphite and then vaporizes a portion of the graphite layer. At the end of the laser marking operation, the surfaces underlying the vaporized regions are typically covered by a thin layer of graphite.

For the laser ablation or marking process, the laser energy must typically exceed a certain minimum threshold level for vaporization of any material to occur. When applied specifically to the marking of gemstones, deposition of excessive laser energy during the ablation process can chip or fracture the gem, thus equipment that reduces the laser energy required for marking, exhibits less risk of damaging the stone. Generally, the threshold energy for vaporization decreases with decreasing laser wavelength, in prior art gem marking systems utilize laser pulses in the green or ultraviolet wavelengths which reduce the laser energy required for the marking process. The duration of these pulses is typically 10 to 100 nanoseconds.

The threshold energy, however, for vaporization of most materials also decreases with decreasing laser pulse duration over a range extending from 10 picoseconds to 100 nanoseconds. Consequently, laser energy required for marking gemstones can be reduced by utilizing a laser with a pulse duration significantly shorter than that utilized in the prior art. Since the size, cost and support facilities associated with a laser source typically increase with its pulse energy capability, reduction of the pulse duration of the marking laser has the potential for reducing the overall size and cost of the marking system. Further, reducing the laser pulse duration to 1 nanosecond or less has the additional benefit of reducing the graphite residue remaining after marking diamond gemstones.

SUMMARY OF THE INVENTION

The present invention provides for a method and system for laser marking a gemstone. A pulsed laser generates a laser pulse with a pulse duration of less than 1 nanosecond. The laser pulse is directed towards a focusing lens which focuses the laser pulse onto a surface of a gemstone. A computer control system controls displacement of the gemstone with respect to the focused laser pulse in order to mark a predetermined pattern onto the surface of the gemstone.

Displacement of the gemstone with respect to the laser pulse is performed either by mounting the gemstone on a stage which is movable along three orthogonal axes, or directing the laser pulse through a set of movable optical elements. Additionally, a video camera and video display are provided for displaying and recording the laser marking process.

It is a principal objective of the subject laser marking system and method to provide a pulsed laser which generates a laser pulse having a duration of 1 nanosecond or less.

It is a further objective of the subject method and system for laser marking a gemstone to provide a focusing element for focusing the laser pulse onto the surface of a gemstone.

It is a further objective of the subject invention to provide a means for displacing the gemstone with respect to the focused laser pulse.

It is a further objective of the subject invention concept to provide a video camera and associated video display for displaying and recording the laser marking process.

It is an important objective of the present invention to provide a computer control system for controlling the displacement of the gemstone with respect to the focused laser pulse along a predetermined displacement path in three dimensions.

Another objective of the present invention is to provide a visual depiction of the pattern being marked on the gemstone in a magnified state.

DESCRIPTION OF THE PREFERRED EMBODIMENTS

Figure 1:
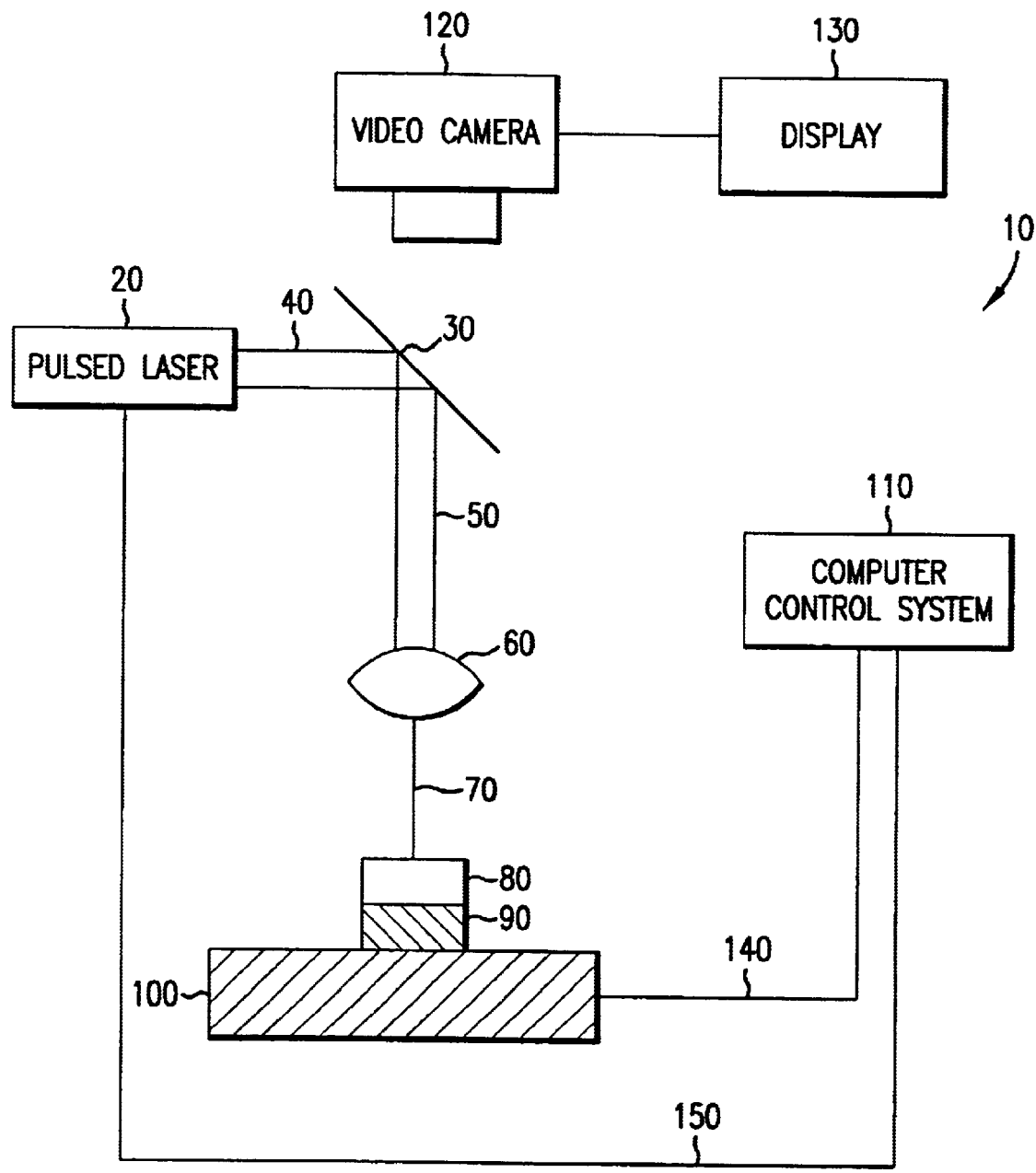
FIG. 1 is a schematic diagram of the subject system for laser marking a gemstone.

Referring to FIG. 1, there is shown a system 10 for laser marking a gemstone 80. System 10 is used for creating specific patterns and designs on a surface of a gemstone. The term "gemstone" as herein defined encompasses diamonds, semiprecious stones, precious stones, pearls and the like.

As shown in FIG. 1, pulsed laser 20 generates a laser pulse 40. In order to decrease chipping, residue formation and damage on the surface of gemstone 80, the pulsed laser 20 generates a laser pulse having a pulse duration of less than 1 nanosecond. Pulsed laser 20 may be a microchip YAG laser, such as the microchip YAG laser produced by JDS Uniphase Corporation of California.

Computer control system 110 is in electrical communication with pulsed laser 20 via data link 150. A user may selectively control the pulse duration of pulsed laser 20, along with the power output of laser pulse 40, by entering and storing pulse related data within computer control system 110. The laser pulse duration is within 10 picoseconds and 1 nanosecond.

In order to direct the laser pulse 40, the pulse is reflected by mirror 30. Mirror 30 may be selectively angled to direct reflected laser pulse 50 towards focusing element 60. Focusing element 60 may be an optically transparent convex lens for focusing laser pulse 50, or the like.

Lens 60 focuses pulse 50 into focused laser pulse 70. Focused laser pulse 70 impinges upon an upper surface of gemstone 80. Gemstone 80 is fixedly secured within fixture 90.

Fixture 90 is mounted on displacement means 100. Displacement means 100 translates fixture 90 and gemstone 80 along three orthogonal axes, such as the X, Y and Z Cartesian axes. Displacement means 100 may be an XYZ-Theta stage, as are well known in the art. One such stage which allows for translation along the X, Y, Z axes and also allows for rotation is the X, Y, Z-Theta stage produced by Aerotech Corporation of Pittsburgh, Pa.

Computer control system 110 is in electrical communication with displacement means 100 via datalink 140. A user can enter and store predetermined patterns for the motion of displacement means 100. Thus, a user may selectively control the motion of gemstone 80 with respect to focused laser pulse 70. Computer control system 110 allows for the selective creation of the patterns etched into the surface of gemstone 80.

Additionally, video camera 120 is provided for capturing real-time images of the laser marking process. Video camera 120 may selectively magnify the images prior to transmitting the video data to display device 130. Display device 130 may be a video display monitor or the like. Video cameras are well known in the art. One such video camera is the DCR-TRV 17 produced by Sony Corporation of America of New York, N.Y.

Additionally, video camera 120 may transmit the video data to a separate memory storage system (not shown). Video data may be stored on video cassettes, other magnetic media such as floppy discs, a hard disc drive, laser video disc, CD, DVD, RAM memory, or other suitable memory storage devices.

In an alternate embodiment, the focused laser pulse 70 may be translated with respect to the remainder of system 10, rather than gemstone 80 being translated with respect to the focused pulse 70. This system, shown in FIG. 2, utilizes a beam steering assembly 160. Beam steering assembly 160 utilizes rotatable mirrors and lens assemblies in order to translate the output laser pulse 50 three-dimensionally.

Computer control system 110 is in electrical communication with beam steering assembly 160 via datalink 170. Through the use of computer control system 110, a user may selectively enter and control the predetermined path of the output laser pulse 50. Beam steering systems utilizing angularly and spatially adjustable lenses and mirrors are well known in the art. One such system is the 22-9013 Beam Steering Device manufactured by Coherent Opto-mechanics of Auburn, Calif. Beam steering devices typically are used for redirecting a laser beam both rotationally and spatially.

Figure 2:
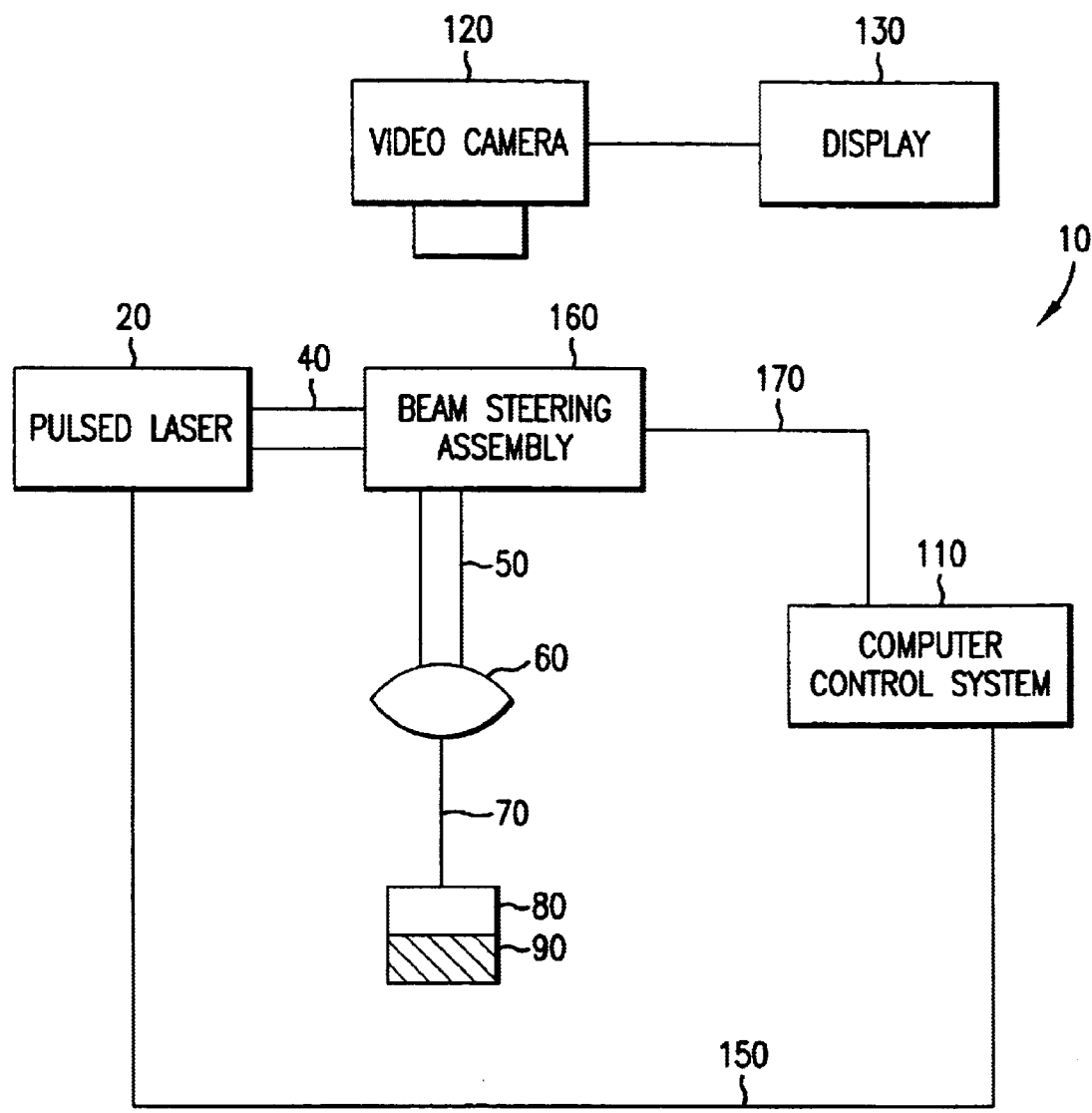
FIG. 2 is a schematic diagram showing an alternate embodiment of the system for laser marking a gemstone.

In the system of FIG. 2, gemstone 80 is mounted on fixture 90 and focused laser pulse 70 translates across a surface of gemstone 80 along the predetermined path controlled by computer control system 110.

In the system of FIG. 2, pulsed laser 20 generates laser pulse 40 which is received by the beam steering assembly 160. The beam steering assembly 160 includes optical elements such as lenses and mirrors which are rotatable and translatable under the control of computer control system 110. A user enters a predetermined path for the output pulse 50 into the computer control system 110. The computer control system 110 delivers control instructions to the beam steering assembly 160 by datalink 170.

Output pulse 50 is focused by focusing lens 60 into the focused laser pulse 70. Laser pulse 70 marks an upper surface of the gemstone 80 which is received in fixture 90.

Computer control system 110 further controls the pulse duration of pulse laser 20 through electrical communication datalink 150.

Additionally, video camera 120 receives and records images associated with the process of marking gemstone 80 with the laser pulse 70. Display 130 is in electrical communication with video camera 120 and displays the process and associated images. Additionally, video camera 120 may be used to magnify the images associated with the laser marking of gemstone 80.

Figure 3:
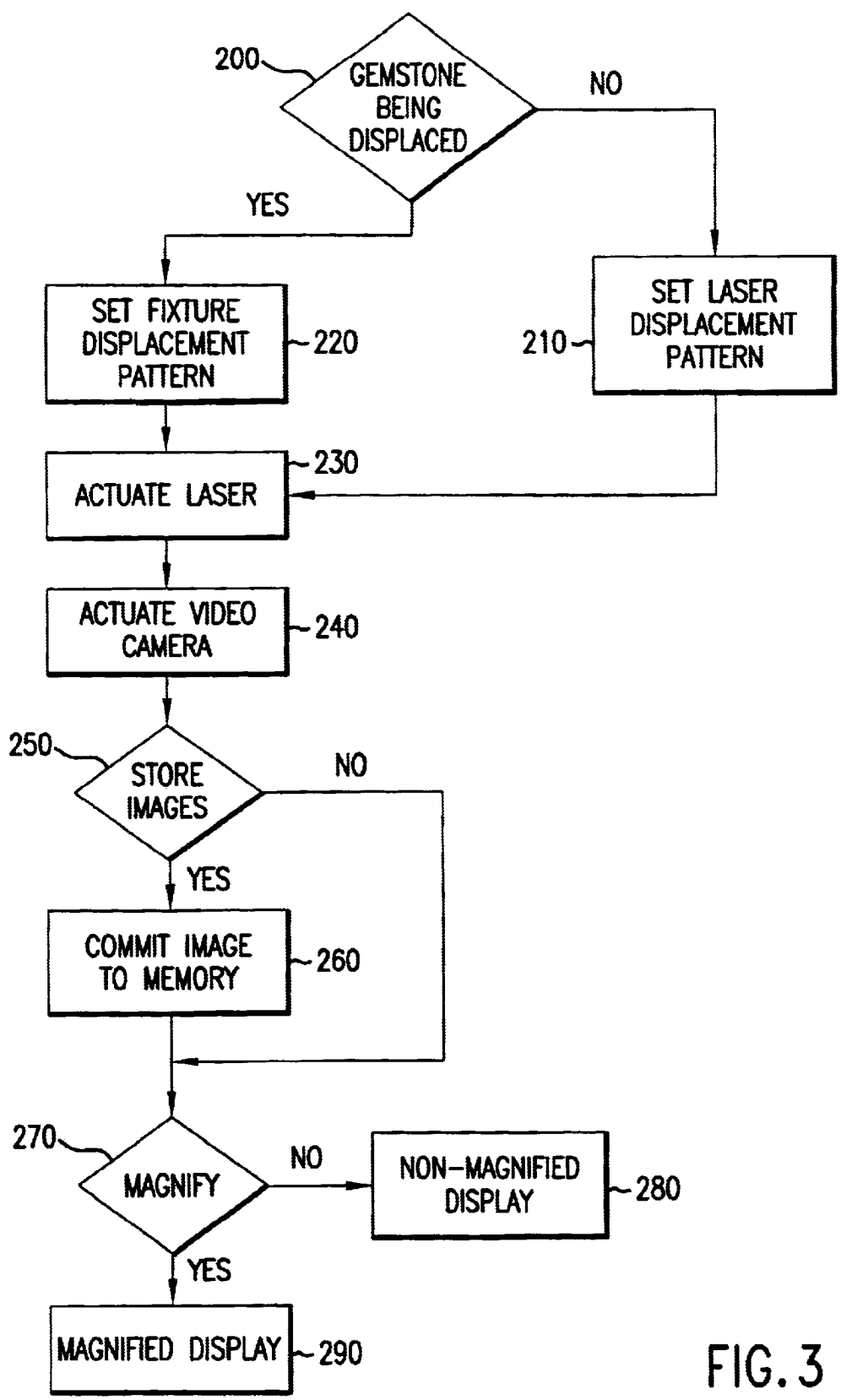
FIG. 3 is a flow diagram illustrating the method steps for the process of laser marking a gemstone in accordance with the subject invention concepts.

FIG. 3 is a flow diagram illustrating the steps of the process for laser marking a gemstone. At step 200, a user determines whether gemstone 80 will be displaced with respect to the remainder of system 10 or if the focused laser pulse 70 will be displaced. This decision chooses between the embodiments of FIGS. 1 and 2, respectively.

If the user chooses to displace the gemstone utilizing displacement means 100, the system passes to step 220. In step 220, the user, utilizing computer control system 110, enters and sets the pre-determined displacement pattern for displacement means 100. The process then passes to step 230, where the pulsed laser 20 is actuated.

At step 200, if the user decides to displace the laser pulse, rather than the gemstone, the process passes to step 210. At step 210, the user, utilizing computer control system 110, enters and sets the pre-determined path of the laser pulse generated by the beam steering assembly 160. The system then passes to step 230, where the pulsed laser 20 is actuated.

Once the pulsed laser 20 is actuated and focused, beam 70 impinges upon an upper surface of gemstone 80, the video camera 120 is actuated at step 240. Once the video camera is actuated, the system passes to decision step 250, where the user may decide whether to store images in a memory storage device or not.

If the user chooses to store the images, the method passes to step 260 where the images are committed to a memory storage device. The system then passes to step 270, where the user decides whether to magnify the image or not. If the user decides not to store images in step 250, the system passes directly to step 270, where the user may decide whether to magnify the images or not.

If the user decides to magnify the images generated by video camera 120, the magnified display is transmitted to display 130 at step 290. If the user decides not to magnify the images, the non-magnified display is transmitted from video camera 120 to display 130 at step 280.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, and in the process method steps described, particular steps may be reversed or interposed, all without departing from the spirit or scope of the invention as defined in the appended Claims.

What is being claimed is:

1. A gemstone laser marking system comprising:

a gemstone mounted on a fixture;

a pulsed laser for generating a laser pulse having a pulse duration of less than 1 nanosecond;

focusing means for focusing said laser pulse onto a surface of said gemstone to be marked;

means for displacing said gemstone with respect to said laser pulse in a three orthogonal axes mode of operation.

2. The gemstone laser marking system as recited in claim 1 wherein a video camera is aligned with said gemstone for recording video images of said gemstone being marked.

3. The gemstone laser marking system as recited in claim 2 wherein a display means is in electrical communication with said video camera for providing a viewable image of said gemstone being marked.

4. The gemstone laser marking system as recited in claim 1 wherein said displacement means includes means for driving said gemstone and said fixture in a predetermined path.

5. The gemstone laser marking system as recited in claim 1 wherein said displacement means includes means for driving said focused laser pulse in a predetermined path.

6. The gemstone laser marking system as recited in claim 5 wherein said displacement means includes:

(a) steering optics for intercepting said laser pulse and directing said laser pulse towards said surface of said gemstone in a predetermined path; and, (b) mirror means for intercepting and re-directing said laser pulse from said pulsed laser to said gemstone, said mirror means being under galvanometric control.

7. The gemstone laser marking system as recited in claim 3 wherein said display means is a video monitor.

8. The gemstone laser marking system as recited in claim 1 wherein a computer control system is in electrical communication with said pulsed laser for controlling said pulse duration.

9. The gemstone marking system as recited in claim 4 wherein a computer control system is in electrical communication with said means for driving said gemstone and fixture in order to control said predetermined path.

10. The gemstone laser marking system as recited in claim 6 wherein a computer control system is in electrical communication with said steering optics for controlling said predetermined path.

* * * * *